United States Patent
Rubakha et al.

(10) Patent No.: US 12,200,127 B2
(45) Date of Patent: Jan. 14, 2025

(54) POINT-TO-POINT TOKENS FOR SOFTWARE-DEFINED NETWORK ANTI-SPOOF PROTECTION

(71) Applicant: Google LLC, Mountain View, CA (US)

(72) Inventors: Dmitri Rubakha, San Jose, CA (US); Alejandro Cornejo, San Jose, CA (US)

(73) Assignee: Google LLC, Mountain View, CA (US)

( * ) Notice: Subject to any disclaimer, the term of this patent is extended or adjusted under 35 U.S.C. 154(b) by 343 days.

(21) Appl. No.: 17/888,595

(22) Filed: Aug. 16, 2022

(65) Prior Publication Data

US 2024/0064018 A1 Feb. 22, 2024

(51) Int. Cl.
*H04L 9/32* (2006.01)
*H04L 9/08* (2006.01)
*H04L 9/40* (2022.01)

(52) U.S. Cl.
CPC .......... *H04L 9/3213* (2013.01); *H04L 9/0869* (2013.01); *H04L 9/3239* (2013.01); *H04L 63/1466* (2013.01)

(58) Field of Classification Search
CPC ... H04L 9/3213; H04L 9/0869; H04L 9/3239; H04L 63/1466
See application file for complete search history.

(56) References Cited

U.S. PATENT DOCUMENTS

| | | | |
|---|---|---|---|
| 7,188,254 B2 | 3/2007 | Somin et al. | |
| 8,196,186 B2 | 6/2012 | Mityagin et al. | |
| 9,069,940 B2 * | 6/2015 | Hars | H04L 63/0823 |
| 9,143,489 B2 * | 9/2015 | Chaturvedi | H04L 67/104 |
| 10,264,066 B2 | 4/2019 | Fishler et al. | |
| 11,216,802 B2 | 1/2022 | Overholser et al. | |
| 2015/0319151 A1 * | 11/2015 | Chastain | H04L 9/083 713/171 |
| 2017/0155634 A1 * | 6/2017 | Camenisch | H04L 9/085 |
| 2017/0195119 A1 * | 7/2017 | Roth | H04L 9/3213 |
| 2018/0316676 A1 | 11/2018 | Gilpin et al. | |
| 2019/0238321 A1 * | 8/2019 | Park | G06F 21/107 |
| 2019/0306132 A1 * | 10/2019 | Le Van Gong | H04L 9/0891 |
| 2020/0012511 A1 * | 1/2020 | Ganesh | G06F 9/44526 |
| 2020/0106609 A1 * | 4/2020 | Osborn | H04L 9/0891 |
| 2021/0168125 A1 * | 6/2021 | Vemulpali | H04L 63/062 |
| 2021/0182806 A1 * | 6/2021 | Ornelas | G06Q 20/3678 |
| 2021/0281553 A1 | 9/2021 | Ward et al. | |
| 2021/0409218 A1 | 12/2021 | Elmenshawy et al. | |
| 2022/0131692 A1 | 4/2022 | Alston et al. | |

OTHER PUBLICATIONS

Extended European Search Report for European Patent Application No. 23171898.2 dated Dec. 22, 2023. 8 pages.
Krishnan et al. SDN Enabled QoE and Security Framework for Multimedia Applications in 5G Networks. ACM Transactions on Multimedia Computing Communications Andapplications, Association for Computing Machinery, US, vol. 17, No. 2, Apr. 21, 2021 (Apr. 21, 2021), pp. 1-29.

* cited by examiner

*Primary Examiner* — Vance M Little
(74) *Attorney, Agent, or Firm* — Lerner David LLP

(57) ABSTRACT

Aspects of the disclosure are directed to point-to-point generation and rotation of security tokens to provide anti-spoof protection in a virtual network stack. Existing public key infrastructure can be leveraged to establish secure connections for control plane purposes. The hosts can run local daemons on machines and can establish secure connections to a control plane as well as to other hosts.

20 Claims, 6 Drawing Sheets

POINT-TO-POINT TOKENS FOR SOFTWARE-DEFINED NETWORK ANTI-SPOOF PROTECTION

BACKGROUND

Security tokens can provide anti-spoof protection in a software-defined network (SDN). Typically, a control plane of the virtual network stack can generate a collection of security tokens for each endpoint in the virtual network such that each endpoint can send a unique security token to each other endpoint in the virtual network. The security token can be included in a header of a data packet being transmitted. The control plane can provision receiving hosts with a secret to allow the receiving host to validate the security token presented by a source endpoint before transmitting that data packet to the receiving host or any other scheduled destination endpoints.

To limit impact of a compromised security token or secret and to guard against brute-force token spoofing attacks, the control plane can periodically rotate security tokens and corresponding host secrets. The control plane can generate a new set of secrets for each host and can send respective new secrets to each host. The host can use both the new secret and old secret to verify incoming security tokens. The control plane can generate new tokens based on the new secret and can tell each host to revoke the secret.

However, the control plane telling each host to revoke old secrets is contingent on successful security token rotations, which often fail to be performed within the periodic rotation time. This can be due to multiple external dependencies in security token rotation as well as a control plane preoccupied with managing and migrating growth of virtual machines during cluster expansion. Failing to perform security token rotations can create significant toil in handling the failure manually.

BRIEF SUMMARY

Aspects of the disclosure are directed to point-to-point generation and rotation of security tokens to provide anti-spoof protection in a virtual network stack. Public key infrastructure can be leveraged to establish secure connections for control plane purposes. The hosts can run local daemons on machines and can establish secure connections to a control plane as well as to other hosts. This allows for distribution of the token generation, secret generation, and periodic rotations of tokens and secrets to the hosts. The control plane involvement can be limited to generation and refreshment of the certificates associated with the endpoints programmed in its local host shard. A host failure at worst can only cause problems with tokens to and from that host, but should not lead to cluster-level problems, much less regional or global outages related to token rotation. The recipient host would not need to remember all the tokens it has generated, which greatly reduces resources required, as every host would only need to remember its active and standby secrets.

An aspect of the disclosure provides for a method for securing data packet transmission between hosts of a virtual network stack. The method includes maintaining, by a first host of the virtual network stack, a first active secret and a first standby secret; generating, by the first host, a second active secret after a predetermined period of time; replacing, by the first host, the first active secret with the second active secret; replacing, by the first host, the first standby secret with the first active secret such that the first active secret becomes a second standby secret; generating, by the first host, a security token by generating a cryptographic hash of data packet fields using the second active secret for securing data packets received by the first host; and transmitting, by the first host, the security token to a second host for authenticating data packets received by the first host.

In an example, the method further includes encapsulating, by the second host, the data packet with a header comprising the security token; and transmitting, by the second host, the encapsulated data packet to the first host. In another example, the method further includes verifying, by the first host, the security token in the encapsulated data packet with the second active secret or the second standby secret. In yet another example, verifying the security token further includes comparing a security token with cryptographic hashes of the second active secret or the second standby secret with data packet fields.

In yet another example, the method further includes establishing, by the second host, a secure connection to the first host for presenting a signed authorization claim; and verifying, by the first host, the signed authorization claim, wherein the security token is generated based on the verified signed authorization claim.

In yet another example, the second active secret is generated by a pseudo-random number generator of the first host. In yet another example, the secret generation and replacement is periodic.

Another aspect of the disclosure provides for a system including one or more processors; and one or more storage devices coupled to the one or more processors and storing instructions that, when executed by the one or more processors, causes the one or more processors to perform operations for securing data packet transmission between hosts of a virtual network stack. The operations include maintaining a first active secret and a first standby secret; generating a second active secret after a predetermined period of time; replacing the first active secret with the second active secret; replacing the first standby secret with the first active secret such that the first active secret becomes a second standby secret; generating a security token by generating a cryptographic hash of data packet fields using the second active secret for securing data packets received by a first host; and transmitting the security token to a second host for authenticating data packets received by the first host.

In an example, the operations further include encapsulating the data packet with a header comprising the security token; and transmitting the encapsulated data packet to the first host. In another example, the operations further include verifying the security token in the encapsulated data packet with the second active secret or the second standby secret. In yet another example, verifying the security token further includes comparing a security token with cryptographic hashes of the second active secret or the second standby secret with data packet fields.

In yet another example, the operations further include establishing a secure connection to the first host for presenting a signed authorization claim; and verifying the signed authorization claim, wherein the security token is generated based on the verified signed authorization claim.

In yet another example, the second active secret is generated by a pseudo-random number generator of the first host. In yet another example, the secret generation and replacement is periodic.

Yet another aspect of the disclosure provides for a non-transitory computer readable medium for storing instructions that, when executed by one or more processors, causes the one or more processors to perform operations for securing data packet transmission between hosts of a virtual network stack, the operations include maintaining a first active secret and a first standby secret; generating a second active secret after a predetermined period of time; replacing the first active secret with the second active secret; replacing the first standby secret with the first active secret such that the first active secret becomes a second standby secret; generating a security token by generating a cryptographic hash of data packet fields using the second active secret for securing data packets received by a first host; and transmitting the security token to a second host for authenticating data packets received by the first host.

In an example, the operations further include encapsulating the data packet with a header comprising the security token; and transmitting the encapsulated data packet to the first host. In another example, the operations further include verifying the security token in the encapsulated data packet with the second active secret or the second standby secret, where verifying the security token further includes comparing a security token with cryptographic hashes of the second active secret or the second standby secret with data packet fields.

In yet another example, the operations further include establishing a secure connection to the first host for presenting a signed authorization claim; and verifying the signed authorization claim, wherein the security token is generated based on the verified signed authorization claim.

In yet another example, the second active secret is generated by a pseudo-random number generator of the first host. In yet another example, the secret generation and replacement is periodic.

DETAILED DESCRIPTION

Generally disclosed herein are implementations for point-to-point generation and rotation of security tokens to provide anti-spoof protection in a virtual network stack. Secure connections for control plane purposes can be established by leveraging public key infrastructure, including providing privacy and integrity of communication via authentication of peers and encryption.

A regionally available control plane can provide authorization claim distribution to all hosts in its shard. Each host can pull a signed authorization claim for each endpoint in that host from the control plane, where each signed authorization claim uniquely identifies data packets that can be sent by each endpoint. Each host can periodically refresh these signed authorization claims by pulling new signed authorization claims from the control plane for as long as the endpoints are scheduled on that host.

All hosts can maintain an active secret and a standby secret. Each secret can be used to generate tokens for remote senders and to validate tokens when receiving packets. An active secret can correspond to a most recently generated secret and a standby secret can correspond to a previously active secret. These secrets can be generated by a cryptographically secure pseudo-random number generator on each host and can be stored in a secure storage location. Periodically, the active secret can become the standby secret, and a new active secret can be generated. Each host can rotate its active and standby secrets independent of other hosts. For example, one host can rotate secrets regardless of how secrets are rotated in another host. Further, hosts can rotate secrets without involvement from the control plane.

When an endpoint scheduled in a first host needs to send data packets to an endpoint in a second host, the first host can establish a secure connection to the second host and can present a signed authorization claim corresponding to the endpoint. The second host can locally verify the signed authorization claim by checking that the signed authorization claim is signed by a trusted authority, and that the claim covers source and destination endpoints. If the authorization check passes, the second host can generate a security token using a cryptographic hash of the current active secret with appropriate fields that are expected in the data packets sent from the endpoint. The second host can then send the security token to the first host.

The first host can use the security token to send the data packets to the second host on behalf of the endpoint. The second host can verify the security token on the received data packet with both the active and standby secrets. For example, the security token must match with one of the resulting cryptographic hashes produced by the active secret or standby secret. The first host can renew the security token periodically by presenting a signed authorization claim and having the second host verify the signed authorization claim.

Figure 1:
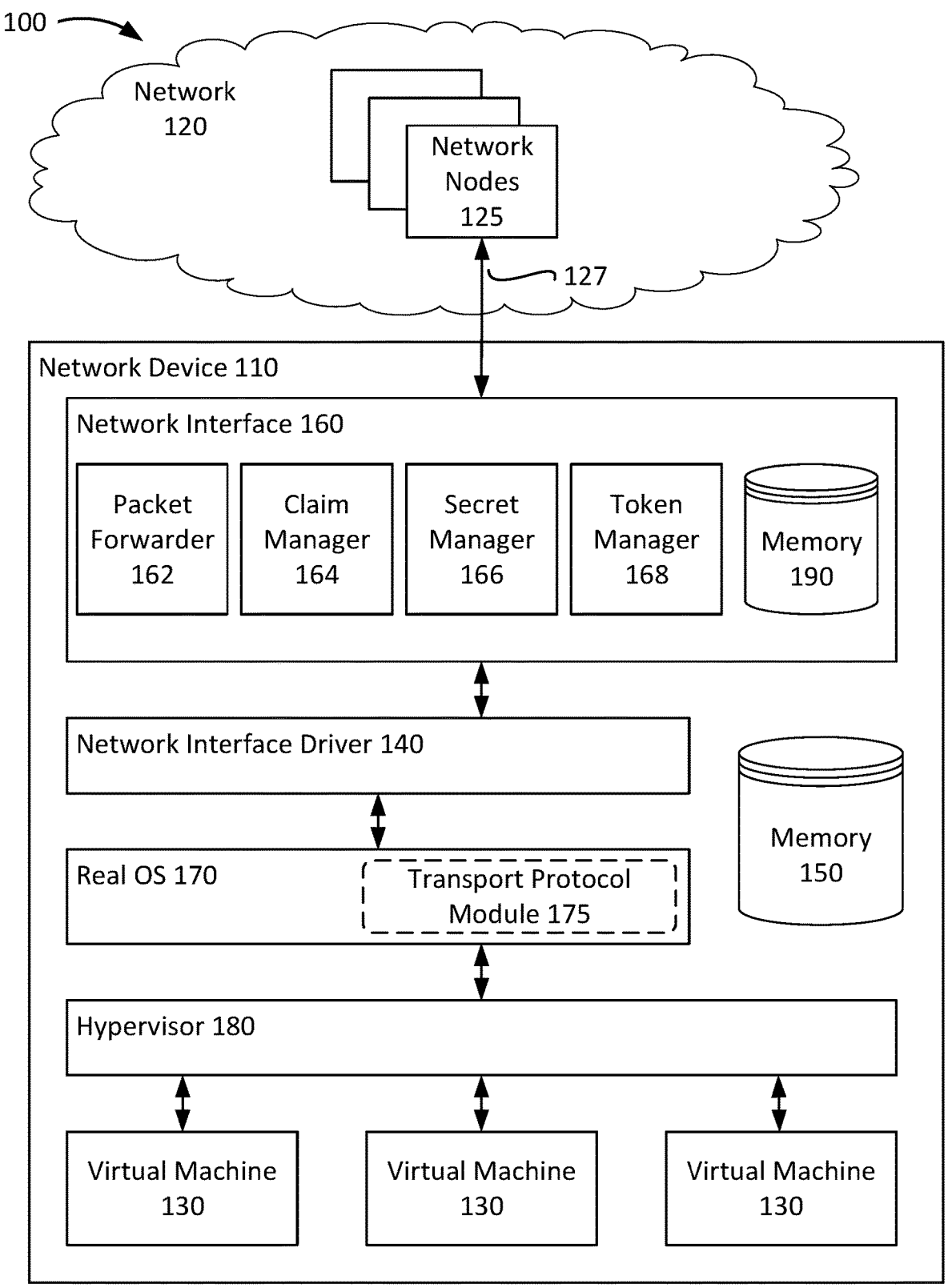
FIG. 1 depicts a block diagram of an example network environment with a network device according to aspects of the disclosure.

FIG. 1 depicts a block diagram of an example network environment 100 with a network device 110. The network environment 100 includes a network 120 of interconnected network nodes 125. The network nodes 125 participate in the network 120 as data sources, data destinations or data sinks, and/or intermediary nodes such as switches, routers, and/or gateways propagating data from sources towards destinations through the network 120. The network nodes 125 can be hosts for endpoints, to be described further below. The network 120 includes the network device 110 with links 127 to various other participating network nodes 125.

The network 120 can facilitate interactions between participant devices. Example networks include the Internet, a local network, a network fabric, or any other local area or wide area network. The network 120 can be composed of multiple connected sub-networks or autonomous networks. The network 120 can be a local-area network (LAN), such as a company intranet, a metropolitan area network (MAN), a wide area network (WAN), an inter-network such as the Internet, or a peer-to-peer network. Any type and/or form of data network and/or communication network can be used for the network 120. The network can be public, private, or a combination of public and private. In general, the network 120 can be used to convey information between computing devices; for example, network nodes 125, and the network device 110.

The network device 110 can be a host device or server executing one or more virtual machines 130 on one or more processors of the network device 110. The network device 110 can include a network interface driver 140, a memory 150, a network interface 160, a real operating system (OS) 170, a hypervisor 180, and the virtual machines 130. The network device 110 can communicate with other network devices over the network 120. The network device 110 and other network devices can create or participate in one or more virtual networks to facilitate communication between virtual machines 130. The one or more virtual networks can overlay the physical network that makes up the network 120. Data packets can be routed within one of the virtual networks overlaying the physical network using a system of data packet encapsulation. The network device 110 and the network nodes 125 can route the data packets according to virtual Internet protocol addresses (VIPs) and MAC addresses. In some examples, the network device 110 can host one or more virtual machines 130 that transmit data packets or receive data packets. In other examples, the network device 110 can be an intermediate node of a path between two virtual machines executing on two separate network devices. Accordingly, the network device 110 can act as a source, destination, or intermediate switch in one or more virtual networks.

The hypervisor 180 can manage operation of the virtual machines 130, including spinning up and terminating the virtual machines 130, managing allocation of memory 150 to the virtual machines 130, and live migrating the virtual machines 130 to other network devices.

The memory 150 can store data and/or computer executable instructions related to the operation and use of the network interface driver 140. The memory 150 can include a random access memory (RAM), a high bandwidth memory (HBM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory, as examples.

The memory 150 can store computer executable instructions of a transport protocol module 175, such as a transmission control protocol (TCP) module or the TCP layer of a network stack, to be executed on a processor of the network device 110. Functionality occurring within a TCP layer of a network stack can be additionally or alternatively executed in another network protocol module within the transport layer, the network layer, or a combined transport/network layer of a network stack. For example, the functionality can be implemented in a user datagram protocol (UDP) module, reliable datagram protocol (RDP) module, reliable user datagram protocol (RUDP) module, or a datagram congestion control protocol (DCCP) module. A network layer, a transport layer, or a combined transport/network layer can generally be referred to as a packet layer of a network stack.

The network interface driver 140 can include a network interface driver software module running on the real OS 170. As an example, the network interface driver 140 can be a collection of computer executable instructions stored in the memory 150 that when executed by a processor help facilitate network communications. As another example, the network interface driver 140 can be implemented as logic in a hardware processor or other integrated circuit, or as a combination of hardware and software logic. The network interface driver 140 can communicate with one of the software virtual machines 130 directly or via a guest OS of the virtual machine 130 and/or the hypervisor 180.

The network interface driver 140 can be included within a layer of a network stack of the real OS 170 of the network device 110. In an example, the network interface driver 140 can be included within a data link layer of a network stack and can communicate with a software module or application that is included in an application layer of the network stack. In another example, the network interface driver 140 can be included within a link layer of a network stack and can communicate with a TCP/IP module that is included in an internet/transport layer of the network stack. In other examples, the functionality occurring within the layer of the network stack can additionally or alternatively be configured to receive packets from another network or transport layer protocol module, such as a UDP module, RDP module, RUDP module, or a DCCP module. While not shown, the network interface driver 140 can be included as a portion of the network interface 160.

The network interface 160 can include a packet forwarder 162, a claim manager 164, a secret manager 166, and a token manager 168, and a memory 190. The memory 190 can store data and/or computer executable instructions related to the operation and use of the network interface 160. The memory 190 can include a RAM, a HBM, a DRAM, a SRAM, a SDRAM, a FRAM, a ROM, a PROM, an EPROM, an EEPROM, and/or a flash memory, as examples.

The packet forwarder 162 can be implemented in an application-specific integrated circuit (ASIC) or as software executing on a microprocessor. The packet forwarder 162 can receive packets for transmission from the virtual machines 130 and route them to one or more destination virtual machines executing on remote network devices. The packet forwarder 162 can also perform functions that allow the network interface 160 to act as a destination for data packets received over the links 127. For example, the packet forwarder 162 can receive a data packet over one of the lines 127, decapsulate the data packet, and forward the data packet to one or more destination virtual machines 130 executing on the network device 110.

The claim manager 164 can be implemented in an application-specific integrated circuit (ASIC) or as software executing on a microprocessor. The claim manager 164 can request and receive signed authorization claims from a regionally available control plane (not shown) of the network 120. Each signed authorization claim can uniquely identify data packets that can be sent by each virtual machine 130. The claim manager 164 can periodically refresh the signed authorization claims by requesting and receiving new signed authorization claims from the control plane for as long as the virtual machines 130 are scheduled.

The claim manager 164 can present signed authorization claims corresponding to virtual machines 130 to another network device of the network 120. The claim manager 164 can also verify signed authorization claims corresponding to virtual machine from another network device of the network 120. When verifying, the claim manager 164 can check that the signed authorization claim is signed by a trusted authority, such as the control plane or an authorization service, and that the signed authorization claim covers the source and destination virtual machines.

The secret manager 166 can be implemented in an application-specific integrated circuit (ASIC) or as software executing on a microprocessor. The secret manager 166 can maintain an active secret and a standby secret. Each secret can be a random string of bits, such as a key, used to generate tokens for remote senders and to validate tokens when receiving packets. The secret manager 166 can generate the secrets using a cryptographically secure pseudo-random number generator. The secrets can be stored in memory 190. Periodically, the secret manager 166 can generate a new active secret, where the previously active secret will become the standby secret.

The token manager 168 can be implemented in an application-specific integrated circuit (ASIC) or as software executing on a microprocessor. The token manager 168 can generate security tokens using a cryptographic hash of the current active secret and send the security token to another network device. The token manager 168 can receive the security token with a received data packet from another network device and can verify the security token with either the active or standby secret. For example, the security token must match with one of the resulting cryptographic hashes produced by the active secret or standby secret. The token manager 168 can also receive security tokens from other network devices to include in data packets being transmitted from the network device 110. The token manager 168 can renew the security tokens periodically based on the signed authorization claims from the claim manager 164.

Figure 2:
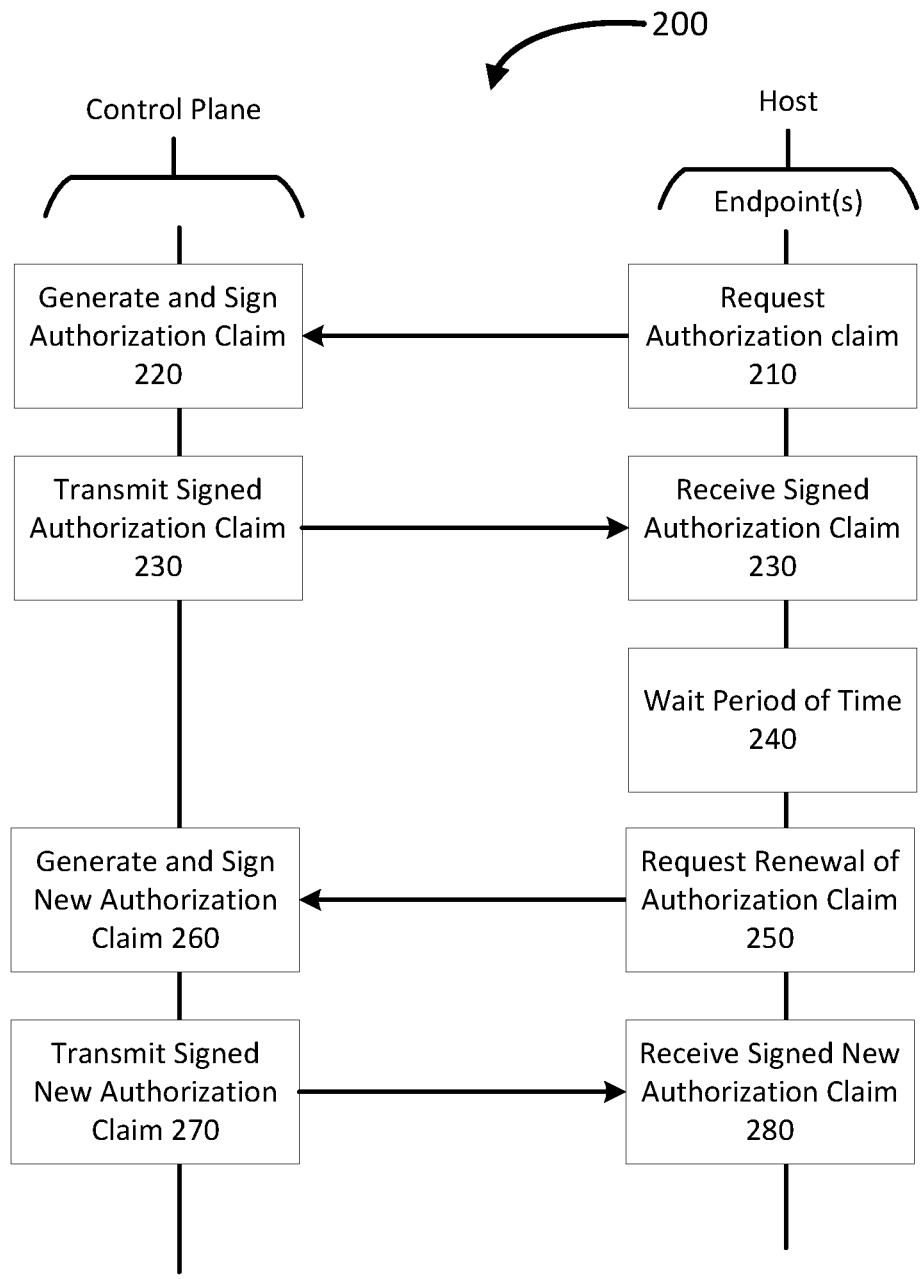
FIG. 2 depicts a swim lane diagram of an example authorization claim distribution between a host and a control plane according to aspects of the disclosure.

FIG. 2 depicts a swim lane diagram 200 of an example authorization claim distribution between a host and a control plane. The host and control plane can correspond to network nodes 125 of the network 120 depicted in FIG. 1. The host can include one or more endpoints, which can correspond to the virtual machines 130 depicted in FIG. 1.

The host can establish a secure connection with the control plane so that a host can request an authorization claim from the control plane 210. Establishing a secure connection can include providing privacy and integrity of communication via authentication of peers and encryption, using protocols such as low overhead authentication system (LOAS) or mutual transport layer security (mTLS). The authorization claim can uniquely identify data packets that can be sent and/or received by the endpoint. For example, a claim could be that a virtual machine in a virtual private cloud is allowed to exchange traffic with any other virtual machine in that private cloud. The control plane can generate and sign the authorization claim 220. The control plane can generate the authorization claim based on its knowledge of what endpoints are scheduled on which hosts. The control plane can sign the authorization claim by calling an authorization service or requesting the authorization service for an intermediate key allowing for signing the authorization claim locally. The control plane can then send the signed authorization claim 230 back to the host. The signed authorization claim can be used to securely exchange data packets between hosts without having to check with or pass through the control plane.

After a period of time 240, the host can request a renewal of the authorization claim from the control plane 250. The control plane can generate and sign a new authorization claim 260 and then send the signed new authorization claim 270 back to the host to be received by the host 280. The host can request a renewal of the authorization claim every 2-24 hours, as an example.

A centralized authorization service could replace using signed authorization claims. A source host can send a request for a security token to a receiving host. The receiving host can then call the authorization service with the details of the security token request, such as the requestor virtual/physical IP addresses, virtual network ID, etc. The authorization service can respond with the authorization decision. If approved, the receiving host can send the security token to the source host.

Figure 3:
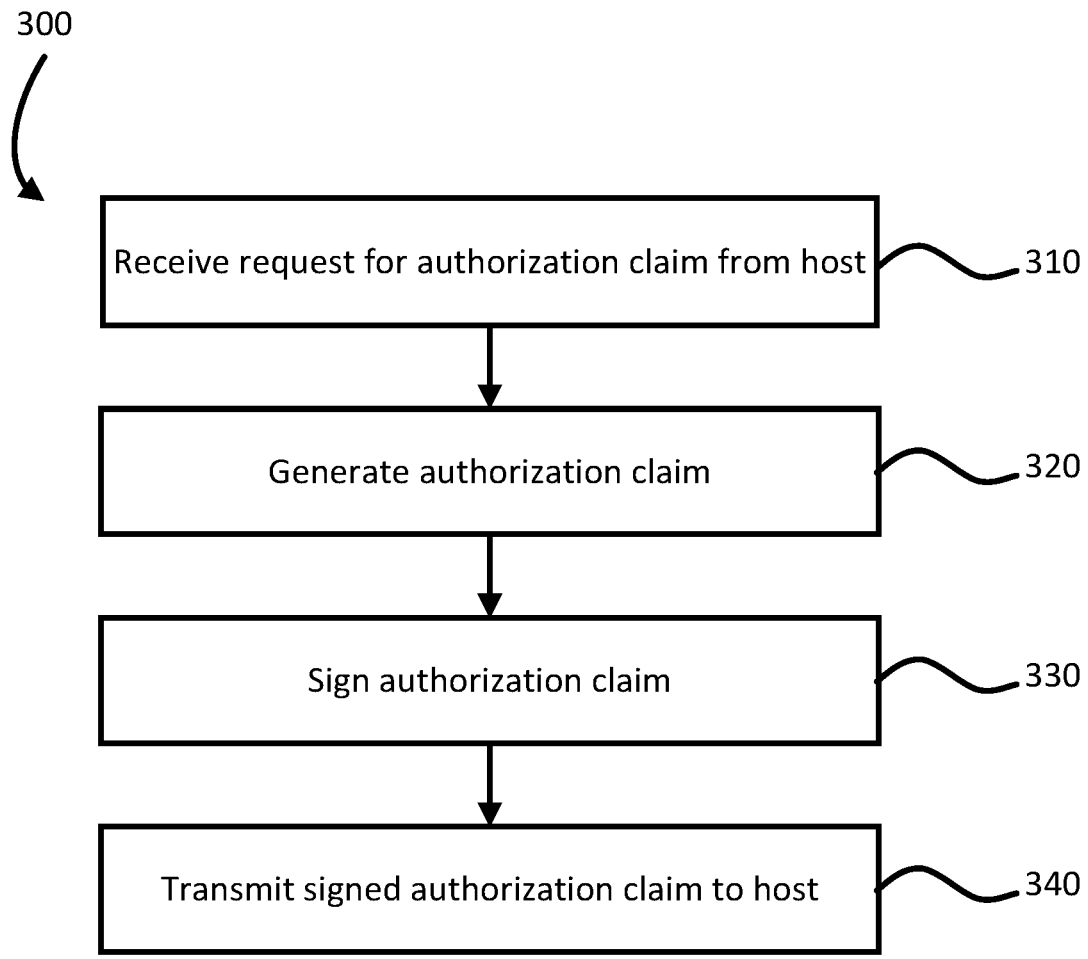
FIG. 3 depicts a flow diagram of an example process for distributing a signed authorization claim to an endpoint of a host according to aspects of the disclosure.

FIG. 3 depicts a flow diagram of an example process 300 for distributing a signed authorization claim to a host via a control plane. The example process 300 can be performed on a system of one or more processors in one or more locations, such as the claim manager 164 of the network device 110 as depicted in FIG. 1.

As shown in block 310, the claim manager 164 can receive a request for an authorization claim from a host. As shown in block 320, the claim manager 164 can generate the authorization claim based on stored data describing what endpoints are scheduled on which hosts. This information can be stored in a memory, such as memory 190.

As shown in block 330, the claim manager 164 can sign the authorization claim. The claim manager 164 can call an authorization service or request the authorization service for an intermediate key allowing for signing the authorization claim locally by the claim manager itself 164. As shown in block 340, the claim manager 164 can then send the signed authorization claim back to the host.

Figure 4:
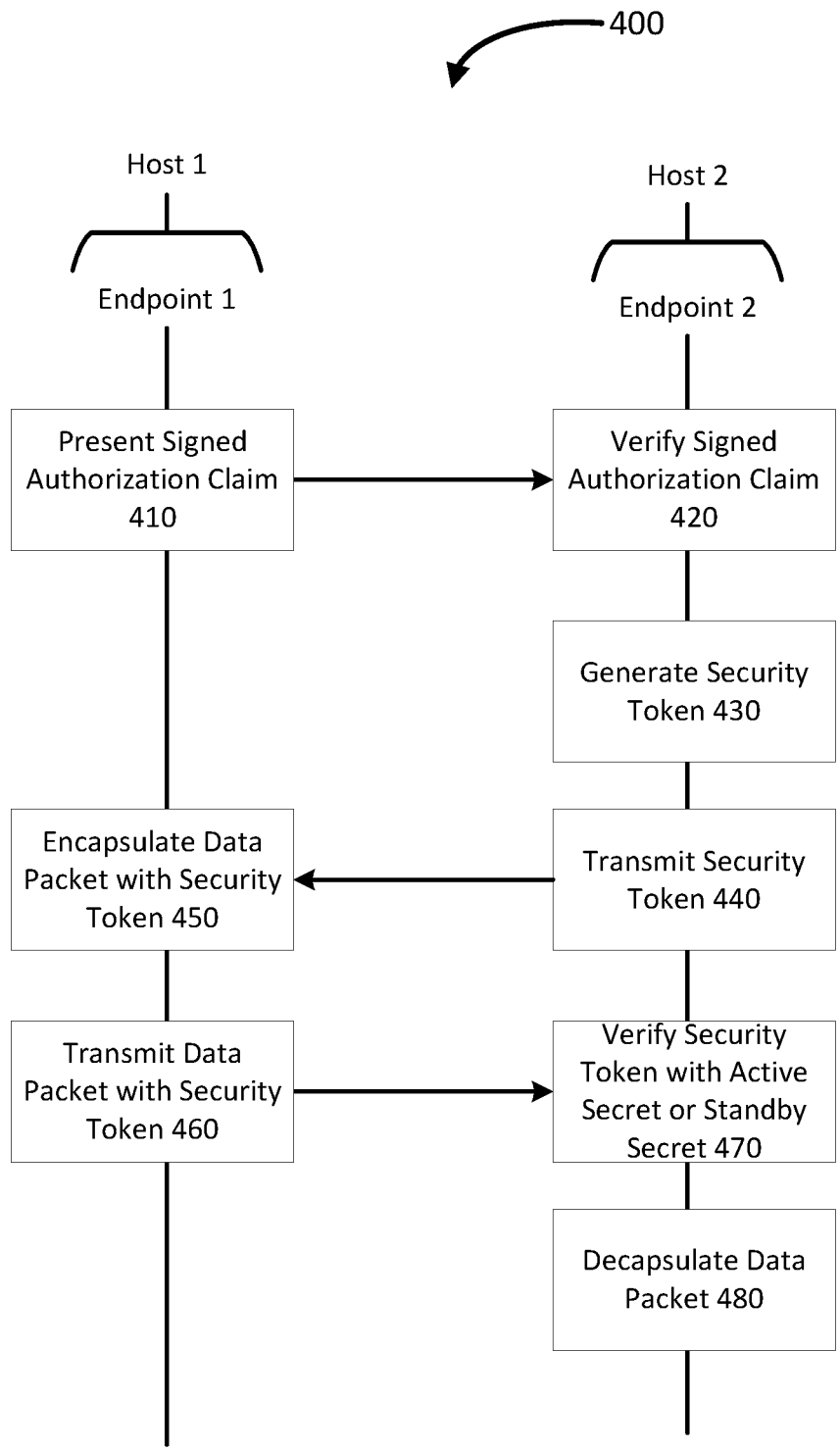
FIG. 4 depicts a swim lane diagram of an example data packet transmission between two hosts according to aspects of the disclosure.

FIG. 4 depicts a swim lane diagram 400 of an example data packet transmission between two hosts. The hosts can correspond to network nodes 125 of the network 120 depicted in FIG. 1. The host can include one or more endpoints, which can correspond to the virtual machines 130 depicted in FIG. 1.

Each host can maintain an active secret and a standby secret. Each secret can correspond to a random string of bits, such as a key, used to generate tokens for remote senders and to validate tokens when receiving packets. An active secret can correspond to a most recently generated secret and a standby secret can correspond to a previously active secret. The secrets can be maintained by one or more processors in one or more locations, such as the secret manager 166 of the network device 110 as depicted in FIG. 1. The secret manager 166 can generate the secrets using a cryptographically secure pseudo-random number generator. The secrets can be stored in a secure location, such as memory 190. Periodically, for example every two hours to twenty four hours, a new active secret can be generated by the secret manager 166, with the old active secret becoming the new standby secret. Each host can rotate its active and standby secrets independent of other hosts. For example, one host can rotate secrets regardless of how secrets are rotated in another host. Further, hosts can rotate secrets without involvement from the control plane.

For a first endpoint of a first host to send a data packet to a second endpoint of a second host, the first host establishes a secure connection to the second host to present a signed authorization claim 410 corresponding to the first endpoint. Establishing a secure connection can include providing privacy and integrity of communication via authentication of peers and encryption, using protocols such as LOAS or mTLS.

The second host can locally verify the signed authorization claim 420 by checking that the signed authorization claim is signed by a trusted authority, such as the control plane. The second host can also check that the signed authorization claim covers the first and second endpoints.

If the second host approves the signed authorization claim, the second host can generate a security token 430 using a cryptographic hash of the current active secret along with fields expected in the data packet to be sent from the first endpoint of the first host. Example fields can include source Internet protocol (IP), destination IP, and virtual private cloud identification (VPC ID). The second host can then send the security token 440 to the first host.

If the second host does not approve the signed authorization claim, the first host can receive an error. Further, a counter for failing token requests telemetry information can be increased.

The first host can receive the security token and encapsulate the data packet with the security token 450 to transmit to the second endpoint 460 of the second host on behalf of the first endpoint. The second host can receive the encapsulated data packet and verify the security token 470 on the data packet with either the active or standby secret. For example, the security token must match with one of the resulting cryptographic hashes produced by the active secret or standby secret. If the security token is verified, the second host can decapsulate the data packet 480.

If the security token is not verified, the data packet can be rejected and a telemetry information counter for failing data packets can be increased.

The security token can be renewed periodically, for example every 2 hours. The first host can present a signed authorization claim, which may or may not be the previously presented signed authorization claim, and the second host can then verify the signed authorization claim to generate a new security token. As an example, security token renewals can occur at intervals less than the secret rotation intervals to ensure when a token is generated, it has a guaranteed validity.

Figure 5:
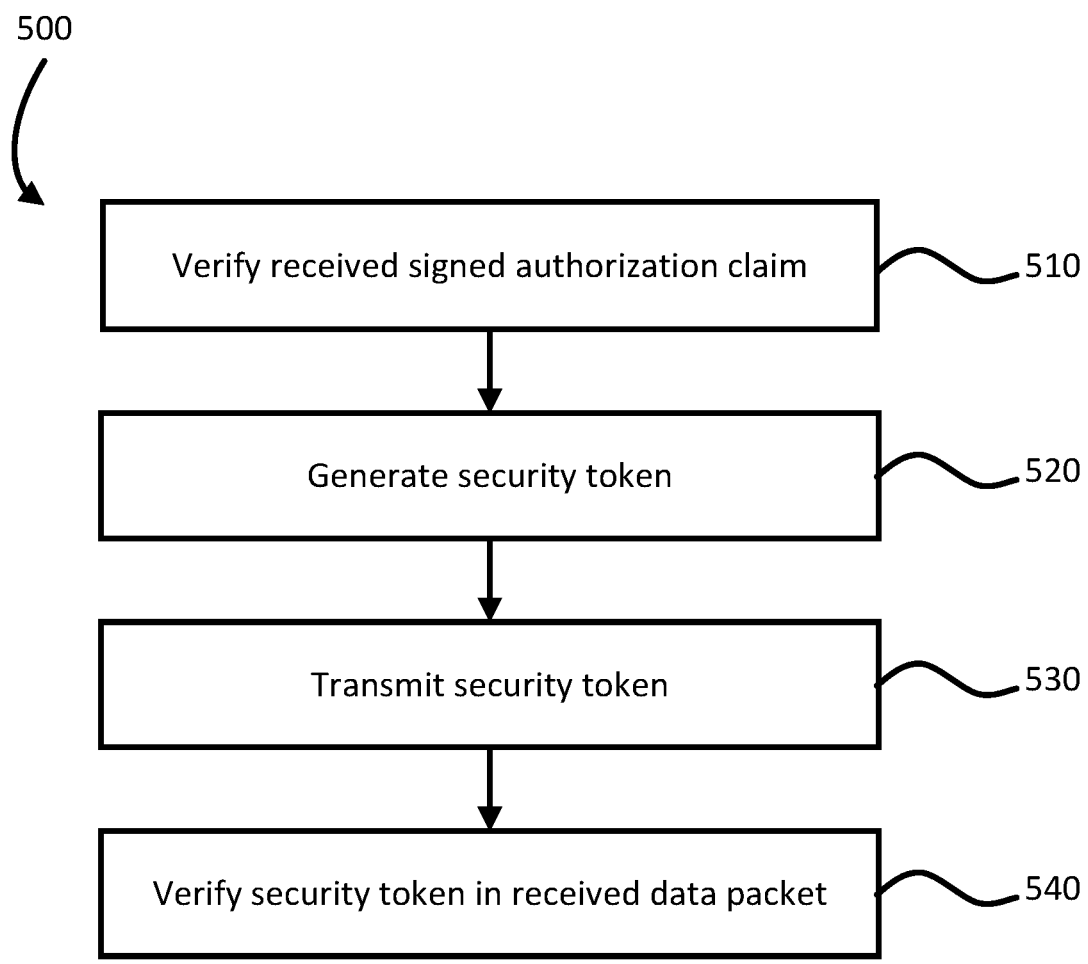
FIG. 5 depicts a flow diagram of an example process for securing a data transmission using a security token according to aspects of the disclosure.

FIG. 5 depicts a flow diagram of an example process 500 for securing a data transmission using a security token. The example process 500 can be performed on a system of one or more processors in one or more locations, such as the token manager 168 of the network device 110 as depicted in FIG. 1.

As shown in block 510, the token manager 168 can verify a received signed authorization claim corresponding to an endpoint of a host that would like to transmit a data packet. The token manager can verify the signed authorization claim by checking that the signed authorization claim is signed by a trusted authority and covers the source and destination endpoints.

As shown in block 520, assuming the token manager 168 approves the signed authorization claim, the token manager 168 can generate a security token using a cryptographic hash of the current active secret as well as field expected in the data packet being sent from the first endpoint. As shown in block 530, the token manager 168 transmits the security token to the host for the endpoint that would like to transmit the data packet.

As shown in block 540, the token manager 168 can receive an encapsulated data packet with the generated security token and verify the security token with either the active or standby secret. As an example, the security token must match with one of the resulting cryptographic hashes produced by the active secret or standby secret. The data packet can be decapsulated assuming the security token is verified.

The tokens generated can be mapped to fixed fields in a header of the data packet that are hashed during token validation. In other examples, such as virtual machines that allow IP forwarding or virtual machines with IP ranges assigned, token generation can ignore certain fields. For example, if a virtual machine is configured with a can_ip_forward, then the virtual machine can send packets on behalf of other virtual machines. In such a case, the token generated for that virtual machine would not include the source IP in its hash. Thus, that field can be ignored during validation.

In other examples, instead of having token generation be based on the active and standby secrets, the hosts can generate the tokens directly using the cryptographically secure pseudo random number generator. Generating the tokens directly would require a host to remember all tokens it has generated as well as their expiration but allows the host to store a binding between every token generated and the claims it expects from packets that use the token. For instance, if a host generates a token to allow an endpoint which has a /16 IP range, then the host can store this binding locally. Whenever validating the token, the host would also verify that the source IP belongs to the /16 IP range.

Figure 6:
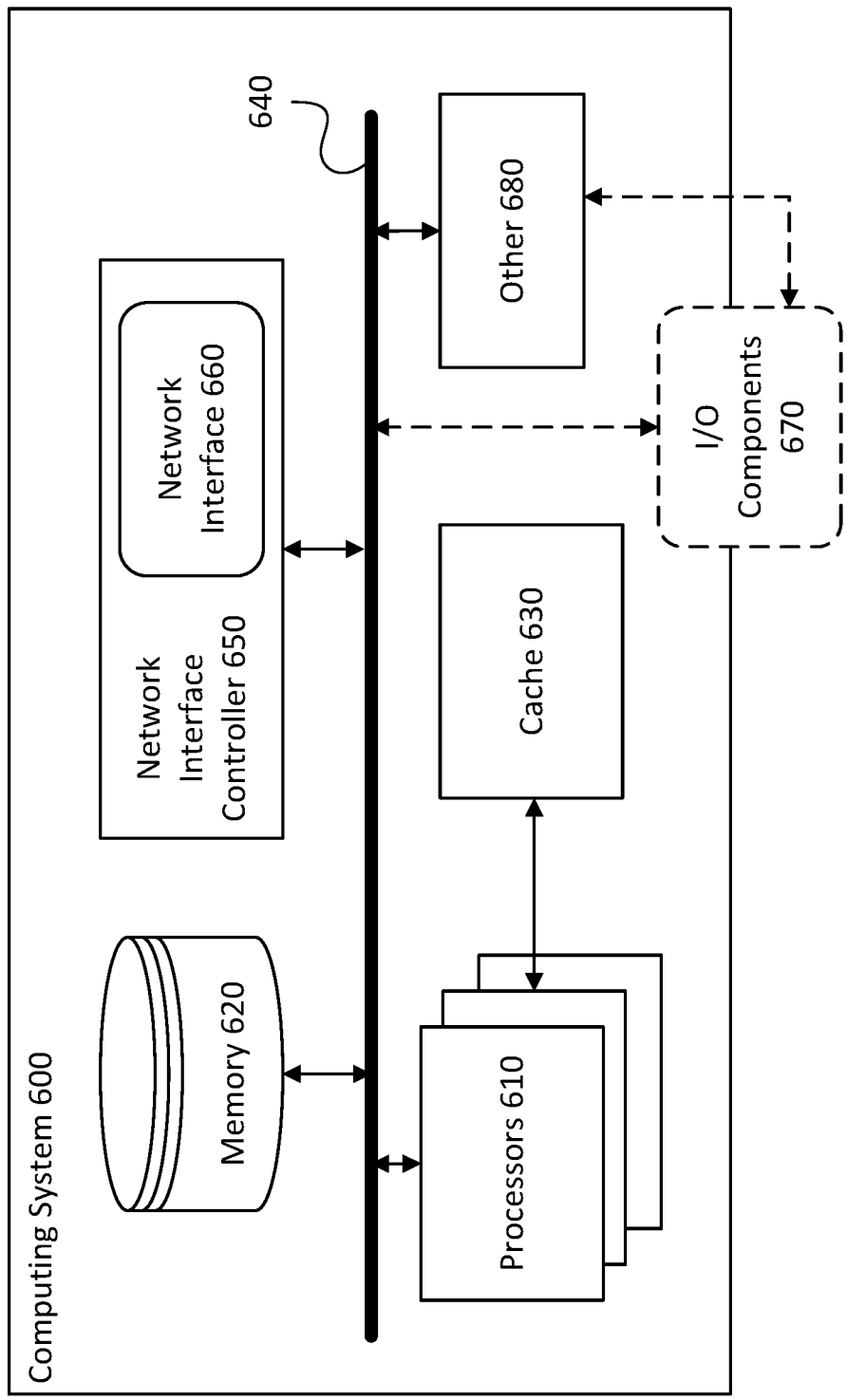
FIG. 6 depicts a block diagram of an example computing system according to aspects of the disclosure.

FIG. 6 depicts a block diagram of an example computing system 600, which can be configured as the network device 110 of FIG. 1. The computing system 600 can include one or more processors 610 in communication with memory 620, at least one network interface controller 650 with network interface port 660 for connection to a network, input/output (I/O) components 670, and other components 680. The processors 610 can be in communication with the memory 620, network interface controller 650, I/O components 670, and other components 680 via a bus 640, as an example. The processors 610 can incorporate, or are connected to, cache memory 630. In some instances, instructions are read from memory 620 into cache memory 630 and executed by the processors 610 from cache memory 630.

The processors 610 can be any logic circuitry that executes instructions fetched from the memory 620 or cache 630. The processors 610 can be microprocessor units or special purpose processors. The computing device 600 can be based on any processor, or set of processors, capable of operating as described herein. The processors 610 can be single core or multi-core processors. The processors 610 can be multiple distinct processors. The processors 610 can be implemented as circuitry on one or more chips.

The memory 620 can be any device suitable for storing computer readable data. The memory 620 can be a device with fixed storage or a device for reading removable storage media. Examples include all forms of non-volatile memory, media and memory devices, semiconductor memory devices, e.g., EPROM, EEPROM, SDRAM, and flash memory devices, magnetic disks, magneto-optical disks, and optical discs, e.g., CD ROM, DVD-ROM, or Blu-Ray® discs. The computing system 600 can have any number of memory devices 620.

The cache memory 630 can be a form of computer memory placed in close proximity to the processors 610 for fast access times. The cache memory 630 can be part of, or on the same chip as, the processors 610. There can be multiple levels of cache 630, e.g., level 2 and level 3 cache layers.

The network interface controller 650 can manage data exchanges via the network interface 660. The network interface controller 650 can handle the physical and data link layers of the open systems interconnection (OSI) model for network communication. Some of the tasks of the network interface controller 650 can be handled by one or more of the processors 610. The network interface controller 650 can be incorporated into the processors 610, such as circuitry on the same chip.

The computing system 600 can have multiple network interfaces 660 controlled by a single controller 650 or multiple network interface controllers 650. Each network interface 660 can be a connection point for a physical network link, e.g., a cat-5 Ethernet link. The network interface controller 650 can support wireless network connections and an interface port 660 can be a wireless, e.g., radio, receiver/transmitter. The network interface controller 650 can implement one or more network protocols such as Ethernet. The computing system 600 can exchange data with other computing systems via physical or wireless links through a network interface 660. The network interface 660 can link directly to another device or to another device via an intermediary device, e.g., a network device such as a hub, a bridge, a switch, or a router, connecting the computing device 600 to a data network such as the Internet.

The computing system 600 can include, or provide interfaces for, one or more input or output (I/O) components 670. Input devices can include keyboards, microphones, touch screens, sensors, and pointing devices, such as a mouse or trackball, as examples. Output devices can include video displays, speakers, and printers, as examples.

Other components 680 can include an I/O interface, external serial device ports, and any additional co-processors. For example, the computing system 600 may include an interface, e.g., a universal serial bus (USB) interface, for connecting input devices, output devices, or additional memory devices, e.g., portable flash drive or external media drive. The computing device 600 can include an additional co-processor, such as a math co-processor to assist the processors 610 with high precision or complex calculations.

The implementations disclosed herein allow for distribution of the token generation, secret generation, and periodic rotations of tokens and secrets to the hosts. The control plane involvement in anti-spoof protection can be limited to generation and refreshment of the authorization claims for the endpoints programmed in its local host shard. A host failure at worst can only cause problems with tokens to and from that host, but should not lead to cluster-level problems, much less regional or global outages related to token rotation. The recipient host would not need to remember all the tokens it has generated, which greatly reduces resources required, as every host would only need to remember its active and standby secrets.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for securing data packet transmission between hosts of a virtual network stack, the method comprising:
    maintaining, by a first host of the virtual network stack, a first active secret and a first standby secret;
    generating, by the first host, a second active secret after a predetermined period of time;
    replacing, by the first host, the first active secret with the second active secret;
    replacing, by the first host, the first standby secret with the first active secret such that the first active secret becomes a second standby secret;
    generating, by the first host, a security token by generating a cryptographic hash of data packet fields using the second active secret for securing data packets received by the first host; and
    transmitting, by the first host, the security token to a second host for authenticating data packets received by the first host.

2. The method of claim 1, further comprising:
    encapsulating, by the second host, the data packet with a header comprising the security token; and
    transmitting, by the second host, the encapsulated data packet to the first host.

3. The method of claim 2, further comprising verifying, by the first host, the security token in the encapsulated data packet with the second active secret or the second standby secret.

4. The method of claim 3, wherein verifying the security token further comprises comparing a security token with cryptographic hashes of the second active secret or the second standby secret with data packet fields.

5. The method of claim 1, further comprising:
    establishing, by the second host, a secure connection to the first host for presenting a signed authorization claim; and
    verifying, by the first host, the signed authorization claim;
    wherein the security token is generated based on the verified signed authorization claim.

6. The method of claim 1, wherein the second active secret is generated by a pseudo-random number generator of the first host.

7. The method of claim 1, wherein the secret generation and replacement is periodic.

8. A system comprising:
    one or more processors; and
    one or more storage devices coupled to the one or more processors and storing instructions that, when executed by the one or more processors, causes the one or more processors to perform operations for securing data packet transmission between hosts of a virtual network stack, the operations comprising:
        maintaining a first active secret and a first standby secret;
        generating a second active secret after a predetermined period of time;
        replacing the first active secret with the second active secret;
        replacing the first standby secret with the first active secret such that the first active secret becomes a second standby secret;
        generating a security token by generating a cryptographic hash of data packet fields using the second active secret for securing data packets received by a first host; and
        transmitting the security token to a second host for authenticating data packets received by the first host.

9. The system of claim 8, wherein the operations further comprise:
    encapsulating the data packet with a header comprising the security token; and
    transmitting the encapsulated data packet to the first host.

10. The system of claim 9, wherein the operations further comprise verifying the security token in the encapsulated data packet with the second active secret or the second standby secret.

11. The system of claim 10, wherein verifying the security token further comprises comparing a security token with cryptographic hashes of the second active secret or the second standby secret with data packet fields.

12. The system of claim 8, wherein the operations further comprise:
 establishing a secure connection to the first host for presenting a signed authorization claim; and
 verifying the signed authorization claim;
 wherein the security token is generated based on the verified signed authorization claim.

13. The system of claim 8, wherein the second active secret is generated by a pseudo-random number generator of the first host.

14. The system of claim 8, wherein the secret generation and replacement is periodic.

15. A non-transitory computer readable medium for storing instructions that, when executed by one or more processors, causes the one or more processors to perform operations for securing data packet transmission between hosts of a virtual network stack, the operations comprising:
 maintaining a first active secret and a first standby secret;
 generating a second active secret after a predetermined period of time;
 replacing the first active secret with the second active secret;
 replacing the first standby secret with the first active secret such that the first active secret becomes a second standby secret;
 generating a security token by generating a cryptographic hash of data packet fields using the second active secret for securing data packets received by a first host; and
 transmitting the security token to a second host for authenticating data packets received by the first host.

16. The non-transitory computer readable medium of claim 15, wherein the operations further comprise:
 encapsulating the data packet with a header comprising the security token; and
 transmitting the encapsulated data packet to the first host.

17. The non-transitory computer readable medium of claim 16, wherein the operations further comprise verifying the security token in the encapsulated data packet with the second active secret or the second standby secret, verifying the security token further comprising comparing a security token with cryptographic hashes of the second active secret or the second standby secret with data packet fields.

18. The non-transitory computer readable medium of claim 15, wherein the operations further comprise:
 establishing a secure connection to the first host for presenting a signed authorization claim; and
 verifying the signed authorization claim;
 wherein the security token is generated based on the verified signed authorization claim.

19. The non-transitory computer readable medium of claim 15, wherein the second active secret is generated by a pseudo-random number generator of the first host.

20. The non-transitory computer readable medium of claim 15, wherein the secret generation and replacement is periodic.

* * * * *